United States Patent
Umlauf et al.

(10) Patent No.: US 12,389,818 B2
(45) Date of Patent: Aug. 19, 2025

(54) AGRICULTURAL VEHICLE WITH IMPLEMENT-SPECIFIC OPERATIONAL PROFILES

(71) Applicant: CNH Industrial America LLC, New Holland, PA (US)

(72) Inventors: Nicholas Umlauf, Burr Ridge, IL (US); Brian Hartman, Burr Ridge, IL (US); Pawel Kuros, Mt. Prospect, IL (US); Bryan Nannet, Burr Ridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 225 days.

(21) Appl. No.: 18/079,348

(22) Filed: Dec. 12, 2022

(65) Prior Publication Data

US 2024/0188477 A1    Jun. 13, 2024

(51) Int. Cl.
  *A01B 71/06*   (2006.01)
  *F16H 59/50*   (2006.01)
  *F16H 61/00*   (2006.01)

(52) U.S. Cl.
  CPC ............. *A01B 71/06* (2013.01); *F16H 59/50* (2013.01); *F16H 61/00* (2013.01); *F16H 2061/0087* (2013.01)

(58) Field of Classification Search
  None
  See application file for complete search history.

(56) References Cited

U.S. PATENT DOCUMENTS

| | | | |
|---|---|---|---|
| 11,022,058 B1* | 6/2021 | Clark | F02D 11/105 |
| 2015/0120158 A1* | 4/2015 | Vande Haar | F16H 61/0213 |
| | | | 701/65 |
| 2016/0016588 A1* | 1/2016 | Sereni | B60W 10/10 |
| | | | 180/53.1 |
| 2019/0387658 A1* | 12/2019 | Henry | A01B 76/00 |
| 2020/0272153 A1* | 8/2020 | Ebertseder | A01C 21/00 |
| 2021/0087777 A1* | 3/2021 | Kenkel | E02F 9/2041 |
| 2021/0201531 A1* | 7/2021 | Creaby | A01B 69/001 |
| 2021/0246631 A1* | 8/2021 | Kurosawa | G06V 40/113 |

\* cited by examiner

*Primary Examiner* — Peter D Nolan
*Assistant Examiner* — Jacob Kent Besteman-Street
(74) *Attorney, Agent, or Firm* — Foley & Lardner LLP

(57) ABSTRACT

An agricultural vehicle includes a driveline, an interface, and a control system. The driveline includes an engine, a transmission, and a power take off (PTO). The interface is configured to removably couple an implement with the agricultural vehicle. The implement configured to perform an agricultural function. The control system includes processing circuitry configured to obtain an indication of a type of the implement that is removably coupled with the agricultural vehicle. The processing circuitry is also configured to determine a profile for at least the transmission based on the type of the implement that is removably coupled with the agricultural vehicle. The profile defines an operating parameter for at least the transmission such that the transmission operates in a specific manner for the type of the implement. The processing circuitry is also configured to operate at least the transmission according to the operating parameter of the profile.

20 Claims, 11 Drawing Sheets

AGRICULTURAL VEHICLE WITH IMPLEMENT-SPECIFIC OPERATIONAL PROFILES

BACKGROUND

The present disclosure relates generally to an agricultural vehicle. More specifically, the present disclosure relates to a control system for an agricultural vehicle.

SUMMARY

One embodiment relates to an agricultural vehicle including a driveline, an interface, and a control system. The driveline includes an engine, a transmission, and a power take off (PTO). The interface is configured to removably couple an implement with the agricultural vehicle. The implement configured to perform an agricultural function. The control system includes processing circuitry configured to obtain an indication of a type of the implement that is removably coupled with the agricultural vehicle. The processing circuitry is also configured to determine a profile for at least the transmission based on the type of the implement that is removably coupled with the agricultural vehicle. The profile defines an operating parameter for at least the transmission such that the transmission operates in a specific manner for the type of the implement. The processing circuitry is also configured to operate at least the transmission according to the operating parameter of the profile.

In some embodiments, the control system includes an imaging device configured to obtain an image of the implement. In some embodiments, obtaining the indication of the type of the implement and determining the profile includes performing an image recognition or analysis technique using the image of the implement to determine the type of the implement, and determining the profile by retrieving a predetermined profile including multiple operating parameters that are specific to the type of the implement. In some embodiments, the multiple operating parameters are configured to be used to operate at least the transmission of the agricultural vehicle in the specific manner for the type of the implement.

In some embodiments, obtaining the indication of the type of the implement includes receiving a user input from a display screen of the control system. In some embodiments, the user input includes the type of the implement.

In some embodiments, obtaining the indication of the type of the implement includes establishing communications between a controller of the implement and the processing circuitry through a communications interface. In some embodiments, obtaining the indication of the type of the implement further includes reading the type of the implement from the controller.

In some embodiments, the profile includes multiple operating parameters. In some embodiments, the multiple operating parameters include a forward start gear for the transmission, a maximum forwards speed of the agricultural vehicle, a load sensitivity for the transmission, a shifting aggressiveness for the transmission, a target speed for the PTO, a minimum speed of the engine, a maximum speed of the engine, and a shifting profile for the transmission.

In some embodiments, the operating parameters are automatically determined and set by the processing circuitry without requiring an operator of the agricultural vehicle to set values for any of the operating parameters.

In some embodiments, the processing circuitry is configured to determine or adjust the profile and the operating parameter of the profile based on an indication of whether the agricultural vehicle is currently in field use or being transported on a road.

Another embodiment of the present disclosure is a control system for an agricultural vehicle. The control system includes processing circuitry configured to obtain an indication of a type of an implement that is removably coupled with the agricultural vehicle. The processing circuitry is also configured to determine a profile for at least a transmission of the agricultural vehicle based on the type of the implement that is removably coupled with the agricultural vehicle. The profile defines an operating parameter for at least the transmission such that the transmission operates in a specific manner for the type of the implement. The processing circuitry is also configured to operate at least the transmission according to the operating parameter of the profile.

In some embodiments, the control system includes an imaging device configured to obtain an image of the implement. In some embodiments, obtaining the indication of the type of the implement and determining the profile include performing an image recognition or analysis technique using the image of the implement to determine the type of the implement, and determining the profile by retrieving a predetermined profile including multiple operating parameters that are specific to the type of the implement. In some embodiments, the multiple operating parameters are configured to be used to operate at least the transmission of the agricultural vehicle in the specific manner for the type of the implement.

In some embodiments, obtaining the indication of the type of the implement includes receiving a user input from a display screen of the control system. In some embodiments, the user input includes the type of the implement.

In some embodiments, obtaining the indication of the type of the implement includes establishing communications between a controller of the implement and the processing circuitry through a communications interface. In some embodiments, obtaining the indication of the type of the implement also includes reading the type of the implement from the controller.

In some embodiments, the profile includes multiple operating parameters. In some embodiments, the operating parameters include a forward start gear for the transmission, a maximum forwards speed of the agricultural vehicle, a load sensitivity for the transmission, a shifting aggressiveness for the transmission, a target speed for the PTO, a minimum speed of the engine, a maximum speed of the engine, and a shifting profile for the transmission.

In some embodiments, the operating parameters are automatically determined and set by the processing circuitry without requiring an operator of the agricultural vehicle to set values for any of the plurality of operating parameters. In some embodiments, the processing circuitry is configured to determine or adjust the profile and the operating parameter of the profile based on an indication of whether the agricultural vehicle is currently in field use or being transported on a road.

In some embodiments, the profile and the operating parameter of the profile are determined by the processing circuitry by performing a machine learning technique that uses performance metrics and corresponding values of the operating parameter obtained from a population of agricultural vehicles that are removably coupled with implements that are a same type of the implement. In some embodiments, the machine learning technique uses the performance metrics and the corresponding values of the operating parameter as training data to predict a value of the operating parameter that achieves a desired value of the performance metrics.

Still another embodiment of the present disclosure relates to a method for automatically configuring an agricultural vehicle for a specific type of implement. The method includes obtaining an indication of a type of an implement that is removably coupled with the agricultural vehicle. The method also includes determining a profile for at least the transmission based on the type of the implement that is removably coupled with the agricultural vehicle. The profile defines an operating parameter for at least the transmission such that the transmission operates in a specific manner for the type of the implement. The method also includes operating at least the transmission according to the operating parameter of the profile.

In some embodiments, obtaining the indication of the type of the implement and determining the profile includes performing an image recognition or analysis technique using an image of the implement to determine the type of the implement, and determining the profile by retrieving a predetermined profile including multiple operating parameters that are specific to the type of the implement. In some embodiments, the operating parameters are configured to be used to operate at least the transmission of the agricultural vehicle in the specific manner for the type of the implement.

In some embodiments, obtaining the indication of the type of the implement includes receiving a user input from a display screen of the control system. In some embodiments, the user input includes the type of the implement.

In some embodiments, the profile includes multiple operating parameters. In some embodiments, the multiple operating parameters include a forward start gear for the transmission, a maximum forwards speed of the agricultural vehicle, a load sensitivity for the transmission, a shifting aggressiveness for the transmission, a target speed for the PTO, a minimum speed of the engine, a maximum speed of the engine, and a shifting profile for the transmission. In some embodiments, the operating parameters are automatically determined and set without requiring an operator of the agricultural vehicle to set values for any of the operating parameters.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a control system for an agricultural vehicle is configured to automatically detect an implement for installation on the agricultural vehicle. The control system may use image data from a front or rear camera and analyze the image data to determine a type of the implement (e.g., a plow). The control system can also determine a profile for a transmission, an engine, etc., or more generally, for a driveline of the agricultural vehicle. The profile and operating parameters for the driveline can be determined based on the type of the implement in order to optimize operation of the driveline (e.g., improve shifting of the transmission) in a specific-manner for the type of the implement. In this way, different implements can be automatically detected, and appropriate profiles to improve operation of the agricultural vehicle can be determined, selected, or updated.

Overall Vehicle

Figure 1:
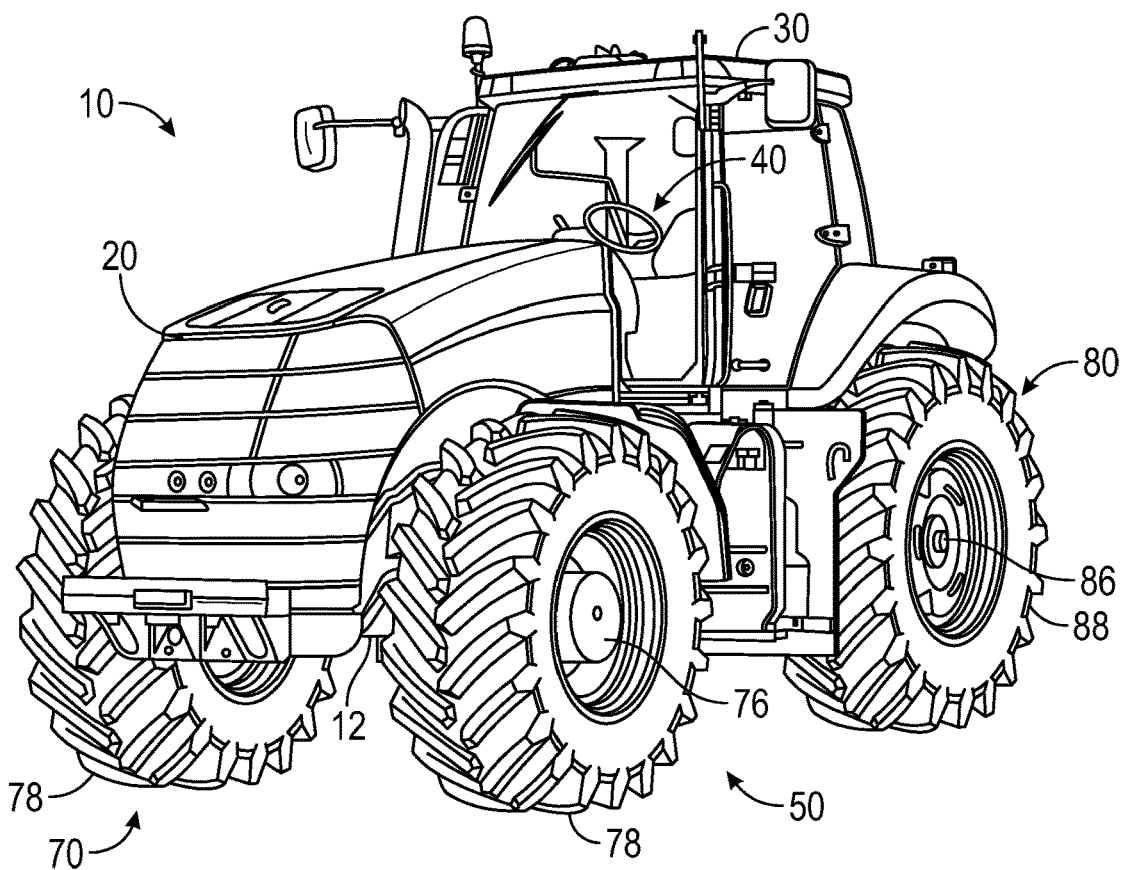
FIG. 1 is a perspective view of a vehicle, according to an exemplary embodiment.
Figure 2:
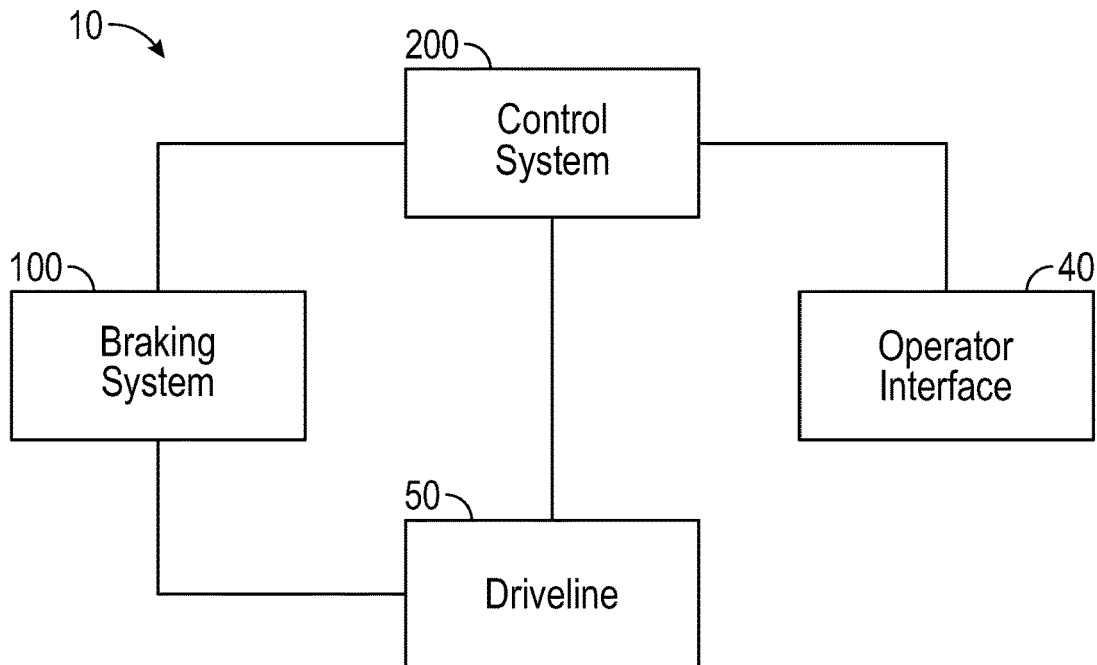
FIG. 2 is a schematic block diagram of the vehicle of FIG. 1, according to an exemplary embodiment.
Figure 3:
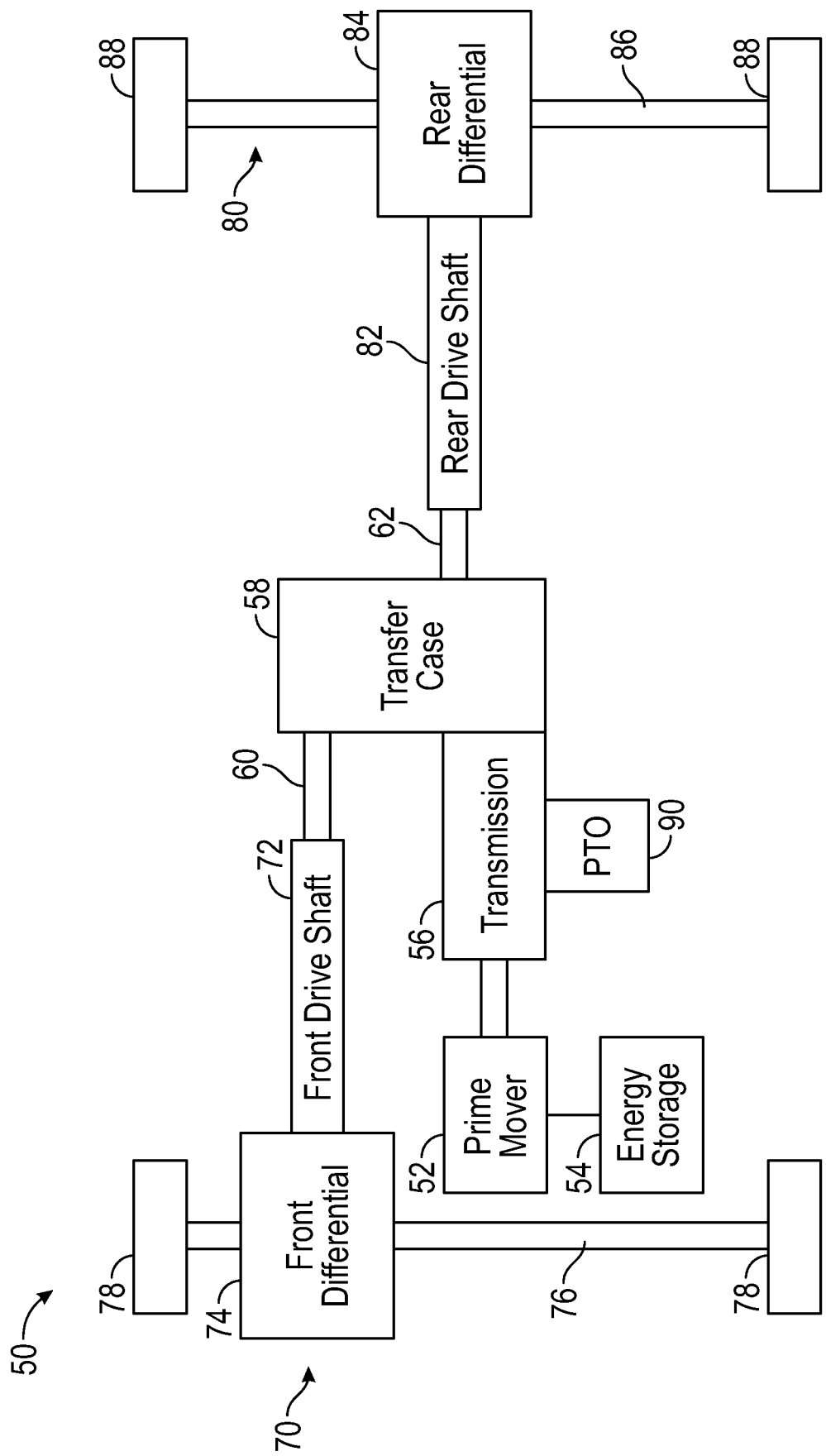
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; and a vehicle control system, shown as control system 200, coupled to the operator interface 40, the driveline 50, and the braking system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Implement-Specific Operational Profiles

Referring to FIGS. 4-14, systems and methods for adjusting operation of the driveline 50 (or more particularly, the transmission 56) according to a profile (e.g., a preset profile, a custom generated profile, a profile determined based on aggregated data and a machine learning technique to optimize a specific characteristic or performance parameter of the vehicle 10, a user updated profile, etc.) are shown. The vehicle 10 may implement the various functionality described herein with reference to obtaining, generating, using, and/or updating the profile (or attributes of the profile) locally on a controller, processing circuitry, a control system, etc., or may communicate with a remote or cloud computing system (e.g., implemented on a server) that performs the functionality described herein with reference to generation, updating, creation, etc., of the profiles. The profiles can be implement and/or vehicle 10 specific such that, when the vehicle 10 operates according to the profile, the vehicle 10 achieves a specific function, operates in a desired manner, or operates in order to optimize a specific performance parameter of the vehicle 10 (e.g., reduced fuel or energy consumption, improved efficiency, improved driving characteristics, improved agricultural characteristics, etc.).

Figure 4:
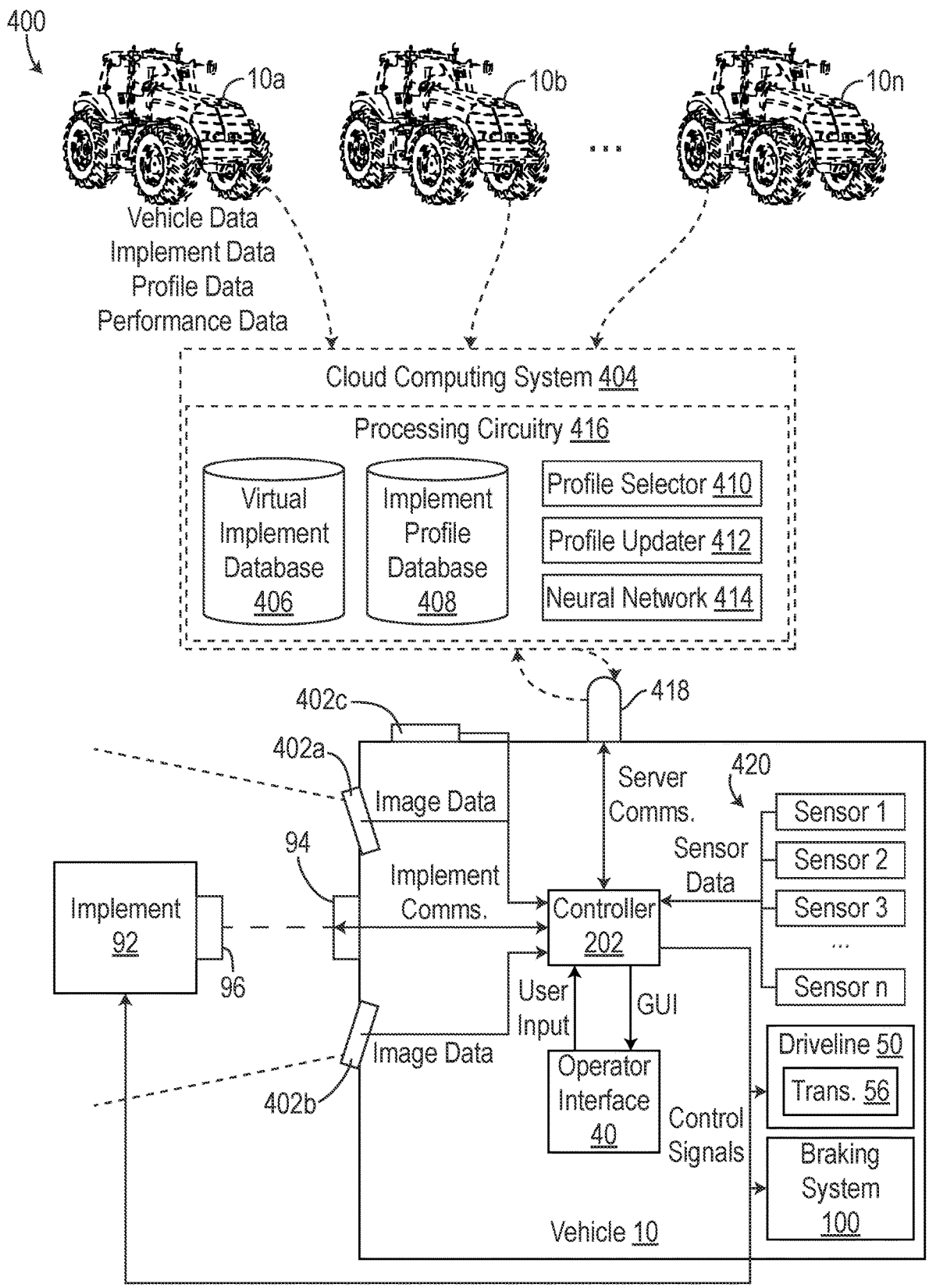
FIG. 4 is a block diagram of a control system of the vehicle of FIG. 1 for automatically determining a profile for the vehicle, according to an exemplary embodiment.

Referring particularly to FIG. 4, a system 400 for creating, updating, and using one or more profiles for the vehicle 10 includes the vehicle 10, an implement 92 of the vehicle 10, and a cloud computing system 404, according to some embodiments. In some embodiments, the system 400 also includes a fleet of n number of vehicles 10a-10n that are configured to provide implement data, profile data (e.g., the attributes of the profile), and performance data to the cloud computing system 404 or the controller 202. In some embodiments, the cloud computing system 404 may use any of the data provided by the fleet of vehicles 10 to update, tune, or modify one or more profiles (e.g., attributes or data of the profiles) for the vehicle 10 based aggregated data from the fleet of vehicles 10a-10n (e.g., a population of vehicles). In some embodiments, the cloud computing system 404 is configured to communicate with telematics systems of various vehicles 10.

Referring still to FIG. 4, the vehicle 10 includes a controller 202, the operator interface 40, multiple sensors 420 (e.g., n sensors), imaging device 402a and imaging device 402b (e.g., cameras, sensors, detectors, etc.), and an implement interface 94. The implement interface 94 may be or include a mechanical interface configured to physically or mechanically couple a corresponding interface 96 of the implement 92 with the vehicle 10 so that the vehicle 10 (e.g., the controller 202) can use and control the implement 92. For example, the implement interface 94 may be or include a draw bar three point hitch, a tow hitch, a front coupler, etc. The implement 92 may be a box blade, a mower/cutter, a front end loader, a rear blade, a post hole digger, a snow blower, a hay rake, a plow, a harrow, a planter, etc., that is configured to perform an operation (e.g., an agricultural action). The implement interface 94 can include an electrical or a communications interface that is configured to electrically or communicably couple with the implement 92 (e.g., electrical components of the implement 92) via the corresponding interface 96. In some embodiments, the implement 92 includes a controller or sensors that are configured to provide or receive control data to/from the controller 202 of the vehicle 10. In some embodiments, the implement 92 includes lights that are powered via a power storage system of the vehicle 10 through the electrical connection between the implement interface 94 of the vehicle 10 and the corresponding interface 96 of the implement 92.

In some embodiments, the sensors 420 include a speed sensor configured to provide a speed of the vehicle 10 to the controller 202, a transmission speed sensor of the transmission 56, a gear sensor that indicates which gear the transmission 56 is currently in, a slip sensor on the rear differential 84, a lock activity sensor of the rear differential 84 or the front differential 74, an engine speed sensor that measures a speed of the prime mover 52, an engine temperature sensor that measures a temperature of the prime mover 52, a fuel sensor, a battery state of charge sensor, a PTO speed sensor that measures a speed of the PTO 90, etc.

In some embodiments, the controller 202 communicates with the implement 92 (e.g., a corresponding controller or microcontroller of the implement 92) via a communications link between the implement and the controller 202 that is established at the communications interfaces of the implement interface 94 and the corresponding interface 96 of the interface 94. In some embodiments, the implement 92 reports a model number or serial number of the implement 92, which the controller 202 can use to select or update a corresponding profile for the implement 92. In some embodiments, the implement 92 (or more specifically, the controller of the implement 92), is configured to report one or more characteristics of the implement 92 (e.g., weight, configuration, capabilities, etc.) to the controller 202 for use in selecting or adjusting the corresponding profile for the vehicle 10 when using the implement 92.

In some embodiments, the controller 202 is configured to obtain image data of the implement 92 from the imaging devices 402a and 402b. In some embodiments, the controller 202 is configured to perform an image recognition technique in order to identify a type and one or more attributes of the implement 92. In some embodiments, the controller 202 is configured to access a virtual implement database 406 and use an image recognition technique or neural network to determine which of the virtual implements stored in the virtual implement database 406 correspond to the implement 92. In some embodiments, the implement 92 includes a printed tag, a bar code, a quick response (QR) code, a printed serial number, etc., or any other physically viewable information that can be captured in the image data and interpreted by the controller 202 to determine the type of the implement 92 and one or more attributes of the implement 92. In some embodiments, the controller 202 is also configured to use the image data to determine where and/or how the implement 92 is physically coupled on the vehicle 10. In some embodiments, the controller 202 is configured to receive a user input from the operator interface 40 that indicates the type of the implement 92. In this way, the user or operator of the vehicle 10 can manually report the type and/or an identifier (e.g., serial number, model number, etc.) of the implement 92 to the controller 202.

The controller 202 is configured to operate a wireless transceiver 418 (e.g., a radio, a cellular dongle, a telematics system, etc.) of the vehicle 10 to communicate with a cloud computing system 404 (e.g., a server, a remote system, a distributed computing system, etc.). In some embodiments, the cloud computing system 404 includes processing circuitry 416 that is configured to facilitate communications between the cloud computing system 404 and the controller 202 of the vehicle 10. In some embodiments, the processing circuitry 416 includes or represents a single processing unit, multiple processing circuits including processors and memory, multiple servers, etc. In some embodiments, the cloud computing system 404 includes the virtual implement database 406, an implement profile database 408, a profile selector 410, a profile updater 412, and a neural network 414. In some embodiments, the cloud computing system 404 is configured to communicate with the vehicle 10 (e.g., the controller 202 of the vehicle 10 via the wireless transceiver 418) to obtain any vehicle data, implement data, profile data, and/or performance data from the vehicle 10. In some embodiments, the cloud computing system 404 is also configured to obtain vehicle data, implement data, profile data, and corresponding performance data of any other vehicles 10a, 10b, . . . 10n (e.g., a fleet). In some embodiments, the virtual implement database 406 includes models or digital twins of different implements that are available for the vehicle 10 or that are owned by an owner of the vehicle 10 and are available for physical installation on the vehicle 10. In some embodiments, the implement profile database 408 includes one or more preset (e.g., predetermined, manufacturer recommended, etc.) profiles, and one or more customized profiles for different implements and corresponding vehicles 10. For example, the implement 92 may have a corresponding virtual implement stored in the virtual implement database 406 with a unique tag or identifier, that can be used to select one or more predetermined profiles and/or customized profiles for the vehicle 10 to operate according to when using the implement 92. In some embodiments, the predetermined profiles are tailored or preset for the particular type of the implement 92, the particular type of vehicle 10 (e.g., model of tractor, size of tractor, performance ratings of the vehicle 10), a particular application or use of the implement 92, etc. In this way, the profiles can be selected from the implement profile database 408 (e.g., by the profile selector 410) based on the type of the implement 92, the type or rating of the vehicle 10, and the desired use case or application of the implement 92. In some embodiments, the cloud computing system 404 is configured to provide the profiles to the controller 202 of the vehicle 10, where a user may select one of the profiles for the controller 202 to operate the vehicle 10 according to.

In some embodiments, the profile updater 412 and/or the neural network 414 are configured to update the profiles that are stored in the implement profile database 408, or to create and write new profiles to the implement profile database 408. In some embodiments, the user of the vehicle 10 provides a user input to update one or more attributes of the profile in the implement profile database 408 (e.g., update an attribute of a customized profile for the implement 92 that is stored in the implement profile database 408). In some embodiments, the profile updater 412 is configured to update or create a new profile according to the user input (e.g., the updated or new profile having the desired or user selected value of the particular attribute) and store the updated or new profile in the implement profile database 408 for future use by the vehicle 10 (e.g., future retrieval).

The neural network 414 may be configured to aggregate data from the vehicle 10 and the fleet of vehicles 10a . . . 10n, and determine appropriate corrections or updates for attributes of dynamic profiles (e.g., profiles that are generated by a neural network and updatable responsive to new aggregate data). In some embodiments, the neural network 414 is configured to learn relationships or patterns between specific profile attributes and performance data of the vehicles 10a . . . 10n, and determine optimal or ideal values of the attributes in terms of their impact on the performance data. For example, the neural network 414 may identify that particular values of attributes improve efficiency of the vehicle 10, other sets of values of attributes for the profiles result in improved torque output, other sets of values of attributes for the profiles result in maximized work output, etc. In some embodiments, the cloud computing system 404 is configured to use a regression technique instead of or in addition to the neural network 414 to determine values for the attributes of the dynamic profiles.

The controller 202 is also configured to operate the vehicle 10 (e.g., the driveline 50, steering systems, or other systems of the vehicle 10) according to one or more profiles selected from the implement profile database 408 based on sensor data obtained from the sensors 420, and based on one or more user inputs (e.g., driving inputs, steering inputs, agricultural control inputs, etc.) for the vehicle 10. In some embodiments, the controller 202 is configured to receive the user inputs from the operator interface 40 (e.g., a human machine interface (HMI)) and use the user inputs to generate control signals for the driveline 50, the implement 92 (e.g., controllable elements of the implement 92), and/or the braking system 100. In this way, the controller 202 may operate the vehicle 10 and/or the implement 92 according to the profile that is currently active for the vehicle 10.

Figure 5:
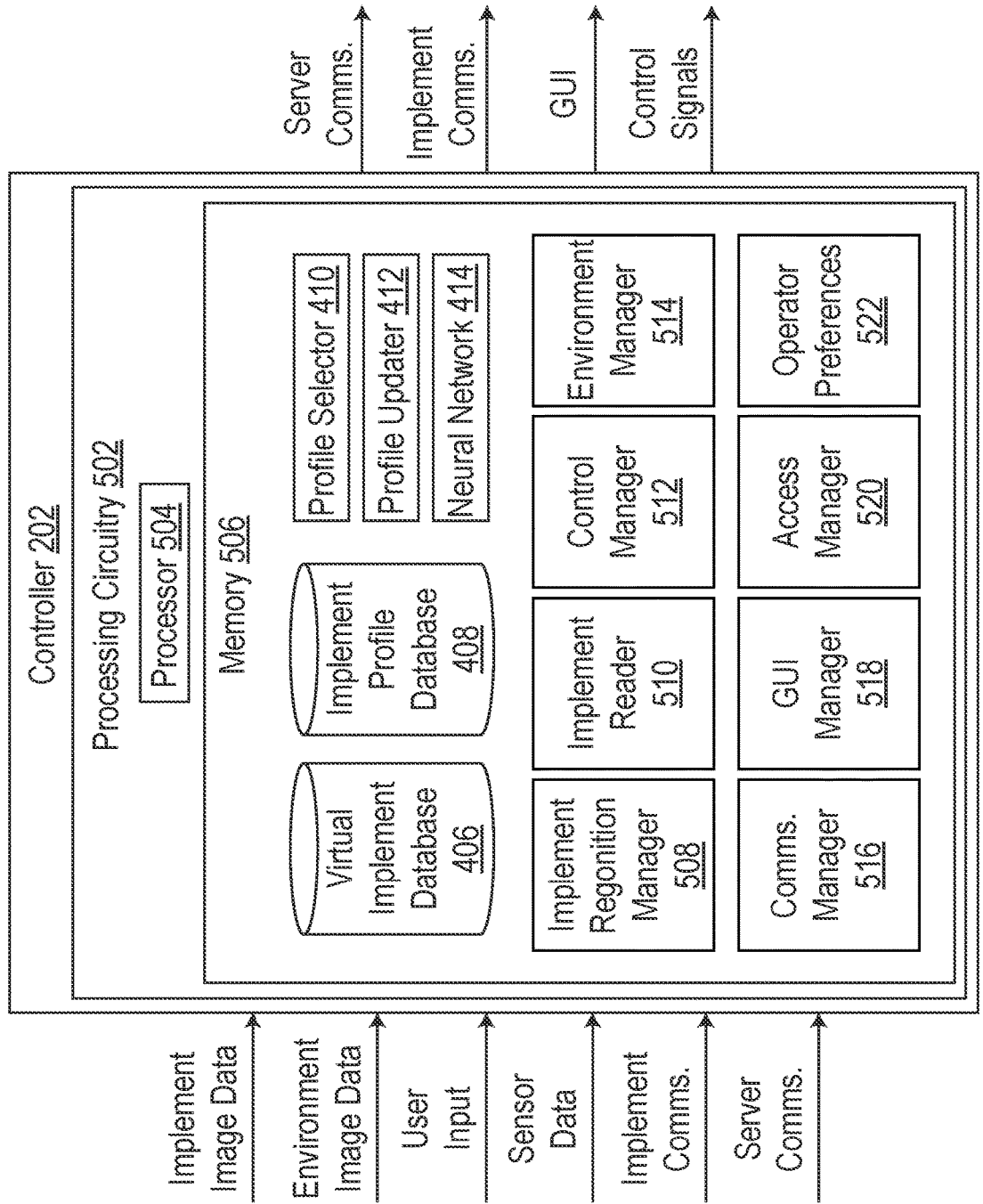
FIG. 5 is a block diagram of a controller of the control system of FIG. 4, according to an exemplary embodiment.

Referring particularly top FIG. 5, the controller 202 is shown in greater detail, according to some embodiments. The controller 202 includes a circuit, shown as processing circuitry 502, a processor, shown as processor 504, and memory, shown as memory 506, according to an exemplary embodiment. Controller 202 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 5, controller 202 includes the processing circuitry 502 and memory 506. Processing circuitry 502 may include an ASIC, one or more FPGAs, a DSP, circuits containing one or more processing components, circuitry for supporting a microprocessor, a group of processing components, or other suitable electronic processing components (e.g., processor 504). In some embodiments, processing circuitry 502 is configured to execute computer code stored in memory 506 to facilitate the activities described herein. Memory 506 may be any volatile or non-volatile computer-readable storage medium capable of storing data or computer code relating to the activities described herein. According to an exemplary embodiment, memory 506 includes computer code modules (e.g., executable code, object code, source code, script code, machine code, etc.) configured for execution by processing circuitry 502. In some embodiments, controller 202 may represent a collection of processing devices (e.g., servers, data centers, etc.). In such cases, processing circuitry 502 represents the collective processors of the devices, and memory 506 represents the collective storage devices of the devices.

In some embodiments, the controller 202 is configured to locally implement any of the functionality of the virtual implement database 406, the implement profile database 408, the profile selector 410, the profile updater 412, and/or the neural network 414 as described in greater detail above with reference to FIG. 4. In some embodiments, the controller 202 offloads the processing of the virtual implement database 406, the implement profile database 408, the profile selector 410, the profile updater 412, and/or the neural network 414 to the cloud computing system 404.

The controller 202 also includes an implement recognition manager 508, an implement reader 510, a control manager 512, an environment manager 514, a communications manager 516, a GUI manager 518, an access manager 520, and operator preferences 522. In some embodiments, the controller 202 is configured to obtain implement image data, environment image data, one or more user inputs, sensor data, implement communications, and server communications, and output server communications, implement communications, one or more GUIs, and control signals for the vehicle 10 or the implement 92 to operate the vehicle 10 and/or the implement 92 according to a profile that is currently active, selected, or implemented on the controller 202.

In some embodiments, the implement recognition manager 508 is configured to obtain the implement image data and perform an image recognition technique to identify the implement 92. In some embodiments, the implement recognition manager 508 is configured to access the virtual implement database 406 and images of various implements of the virtual implement database 406 and compare the implement image data to the images of the various implements in order to identify a match and the type of the implement 92. In some embodiments, the implement recognition manager 508 is configured to use a neural network, a machine learning technique, or artificial intelligence to compare the implement image data to the images of the various implements and determine the type of the implement 92. In some embodiments, the implement recognition manager 508 provides the type of implement to the GUI manager 518 for presentation on the GUIs, and to the profile selector 410 so that an appropriate profile for the vehicle 10 when using the implement 92 can be selected.

In some embodiments, the implement reader 510 is configured to monitor or record communications between the vehicle 10 (e.g., the controller 202) and the implement 92 to identify the type of the implement and/or a specific model number or serial number of the implement 92 based on the implement communications. In some embodiments, the implement reader 510 is configured to generate a query or request message to send to the implement 92 and provides the query or request message to the implement 92. In some embodiments, the implement reader 510 receives a communication or response from the implement 92 that reports the type and/or serial number of the implement 92. In some embodiments, the implement reader 510 is configured to scan the implement 92 or identify characteristics of the communications of the implement 92 to determine or identify the type, model number, and/or serial number of the implement 92.

In some embodiments, the control manager 512 is configured to generate control signals for the vehicle 10 and/or the implement 92 according to the profile that is currently active for the vehicle 10 (e.g., as selected by the profile selector 410). In some embodiments, the control manager 512 receives requests from the operator (e.g., the user inputs provided by operator via the operator interface 40), and operates the driveline 50 and/or the braking system 100 based on the requests from the operator using a control scheme. In some embodiments, the control manager 512 is configured to generate the control signals for the driveline 50 and/or the braking system 100. In some embodiments, for example, the control manager 512 generates control signals according to the profile such as when to shift the transmission 56 between gears, what gear to start the transmission 56 at, speed to run the prime mover 52, etc.

In some embodiments, the environment manager 514 is configured to obtain the environment image data (e.g., from the imaging device 402c) and determine or detect an environment that the vehicle 10 is currently operating within. For example, the environment manager 514 may determine if the vehicle 10 is currently on-road (e.g., for transportation between fields) or in-field. The environment manager 514 may use image data and detect a road, a median or centerline strip, edges of the road, other vehicles, a field environment, etc., to determine if the vehicle 10 is on-road or in-field. In some embodiments, the environment manager 514 provides the identification of the environment of the vehicle 10 (e.g., on-road or in-field) to the profile selector, the profile updater, and/or the control manager 512 so that the vehicle 10 can be operated according to a sub-mode or a sub-profile of the profile that is active on the vehicle 10 for the specific environment. In some embodiments, the profile selector 410 or the profile updater 412 are configured to use to determination of whether the vehicle 10 is on-road or in-field to select an appropriate profile or to adjust one or more attributes (e.g., parameters) of the profile for the on-road or in-field use of the vehicle 10.

In some embodiments, the communications manager 516 is configured to control operation of the wireless transceiver 418 to facilitate communications with the cloud computing system 404. In some embodiments, the communications manager 516 is configured to offload or transmit any of the data collected from the sensors 420, the image data from the imaging devices 402a-402c, any of the implement communications, user inputs or requests to adjust one or more attributes of a profile, etc. The communications manager 516 may receive response messages from the cloud computing system 404 such as the profile, or updated profiles.

In some embodiments, the GUI manager 518 is configured to generate a GUI of the profile and one or more attributes of the profile. In some embodiments, the profile includes multiple profiles for operating different components of the vehicle 10. For example, the profile may include a transmission profile, an engine profile, a steering profile, a PTO profile, an automatic productivity (APM) profile that coordinates operation of the prime mover 52 and the transmission 56 to either improve efficiency of the vehicle 10 or maximize output, a differential locking profile, an energy storage and usage profile, etc.

In some embodiments, the profile is or includes the transmission profile for the specific implement 92 that is currently coupled with the vehicle 10 (e.g., either the front or the rear of the vehicle 10). The transmission profile can include various attributes or parameters and specific values such as a forward start gear, a forward maximum vehicle speed, a sensitivity (e.g., load sensitivity), an aggressiveness (e.g., shift aggressiveness), a PTO target speed, engine speed management parameters such as minimum and maximum engine speed, and autoshift A/B presets. In some embodiments, the values of these attributes or parameters are predetermined and specific for different implements. The transmission profiles can be stored in the implement profile database 408 and automatically selected (e.g., due to image recognition using the image data such as from a front or rear imaging device/camera), or selected in response to a user input that indicates the implement 92 (e.g., the type of the implement 92).

The GUI manager 518 can generate one or more GUIs that illustrate the profile (e.g., the transmission profile) and the attributes or parameters of the profile so that the operator or user can view and/or modify the attributes or parameters of the profile. In some embodiments, the GUIs include fields for modifying or updating the profile. Modifying or updating the attributes of the profile may result in generation and storage of a new custom profile for the vehicle 10 when the vehicle 10 is coupled with the implement 92. In some embodiments, when the vehicle 10 is later re-coupled with the implement 92, the vehicle 10 may default to using the custom profile or the predetermined/manufacturer set profile. In some embodiments, the GUI is also configured to display different operating parameters or visualizations of sensor data.

The access manager 520 can store login credentials for the operator or user of the vehicle 10 and may communicate with the cloud computing system 404 in order to access the virtual implement database 406 and/or the implement profile database 408. In some embodiments, the access manager 520 is configured to validate the operator and facilitate the operator accessing and modifying the profiles.

The operator preferences 522 can include one or more customized profiles or learned preferences for the operator of the vehicle 10 that are stored locally. In some embodiments, the operator preferences 522 include values of the attributes or parameters of the profile that are modified or adjusted by the operator so that the controller 202 can load a customized profile for the user or operator. In some embodiments, the operator preferences 522 are stored in the cloud computing system 404.

Figure 6:
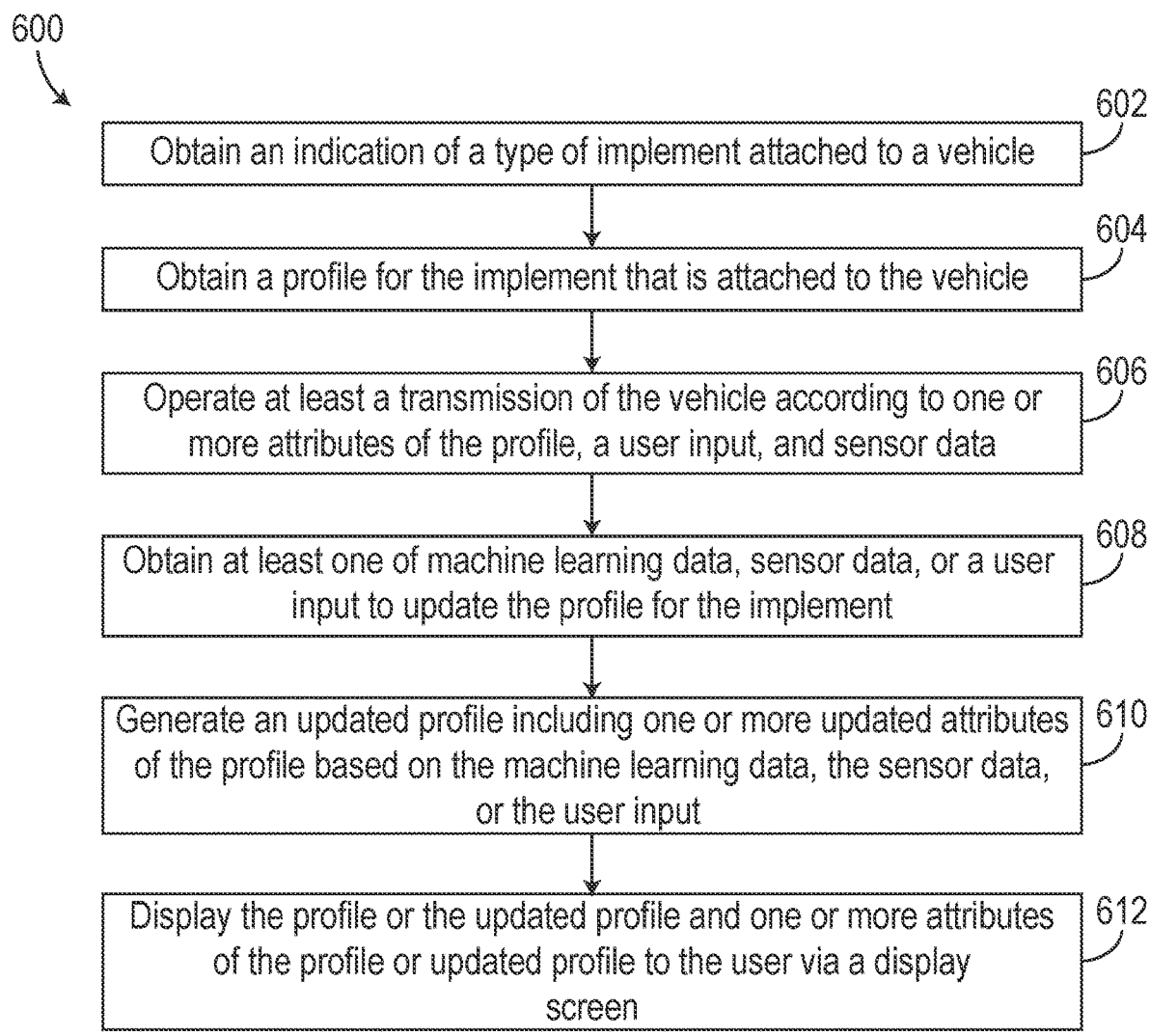
FIG. 6 is a flow diagram of a process for selecting, updating, and using a profile for an agricultural vehicle, according to an exemplary embodiment.

Referring to FIG. 6, a process 600 for determining and operating an agricultural vehicle according to a profile includes steps 602-612. In some embodiments, the process 600 is performed in order to determine a profile for operating one or more components of the vehicle 10 (e.g., the transmission 56 or more generally the driveline 50) in an implement-specific manner. Advantageously, process 600 and the system 400 facilitate automatically setting parameters of the vehicle 10 so that the vehicle 10 operates in a desired manner when an implement 92 (e.g., a trailer, a farm implement, a plow, etc.) is coupled on the vehicle 10.

Process 600 includes obtaining an indication of a type of implement attached to a vehicle (step 602), according to some embodiments. In some embodiments, step 602 is performed by receiving a user input (e.g., prompting the user to enter the implement type, model number, serial number, etc.). In some embodiments, step 602 is performed by obtaining image data from a front or rear camera (e.g., the imaging devices 402a and 402b), and detecting the type of the implement based on the image data obtained (e.g., by performing an image recognition technique). In some embodiments, step 602 is performed by establishing communications with a controller of the implement, and reading a model number, an implement type, or a serial number of the implement. In some embodiments, step 602 is performed by the controller 202.

Process 600 includes obtaining a profile for the implement that is attached to the vehicle (step 604), according to some embodiments. In some embodiments, the profile is obtained from a database of profiles for the vehicle when the implement is installed or coupled on the vehicle. In some embodiments, the profile is a predetermined profile having various attributes or parameters that are set by a manufacturer. In some embodiments, the profile is customized or a stored profile generated by the user. In some embodiments, the profile is generated as the result of a machine learning technique or neural network that has been trained on datasets from a population of vehicles. In some embodiments, the profile includes values of attributes such as a forward start gear, a forward maximum speed of the vehicle, a sensitivity percent (e.g., load sensitivity), an aggressiveness of gear shifting, a PTO target speed (and/or installation type), an engine speed minimum, an engine speed maximum, and autoshift A/B presets (e.g., shifting profiles). In some embodiments, the autoshift A preset is a field mode or a shifting profile for when the vehicle 10 is operating in a field environment, and the autoshift B preset is a road profile for when the vehicle 10 is operating in a road environment.

Process 600 includes operating at least a transmission of the vehicle according to one or more attributes of the profile, a user input, and sensor data (step 606), according to some embodiments. For example, the user input may be operation of a steering wheel and/or a gas pedal to perform a driving operation. Step 606 can include obtaining sensor data such as a current gear of the transmission 56, a current speed of the vehicle, a current engine speed of the prime mover 52, etc. In some embodiments, step 606 includes using the user input, the sensor data, and the profile to generate control decisions for the transmission 56, or more generally, the driveline 50 of the vehicle. In some embodiments, the user input indicates a desired operation, and step 606 includes using the sensor data as feedback for generating the control decisions. The profile may define properties or parameters for a closed loop control scheme to generate the control decisions. In some embodiments, step 606 is performed by the controller 202, or more specifically, by the control manager 512. Step 606 can include transitioning the transmission 56 into the gear as indicated by the profile when operating the vehicle 10 from a stopped or sufficiently low speed state. Step 606 can also include adjusting operation of the prime mover 52 and/or the transmission 56 in order to maintain the vehicle 10 below the maximum speed. Step 606 can also include shifting gears of the transmission 56 according to the aggressiveness of the profile. Step 606 can also include operating the PTO 90 according to the PTO target speed. Step 606 can also include limiting the speed of the prime mover 52 (e.g., an engine) from operating less than the minimum engine speed, or greater than the maximum engine speed. Step 606 can also include operating the transmission 56 to shift according to the A or the B preset shift profiles.

Process 600 includes obtaining at least one of machine learning data, sensor data, or a user input to update the profile for the implement (step 608), according to some embodiments. In some embodiments, the machine learning data is an output of a neural network that is trained to predict one or more performance metrics of the vehicle (e.g., the vehicle 10) as a function of specific values of the attributes or parameters of the profile for the implement. In some embodiments, the sensor data is data obtained from any of the sensors 420 and can be used (e.g., by the controller 202) to identify if the profile is achieving desired operation of the vehicle. In some embodiments, the user input is a request to modify or update one or more attributes of the profile (e.g., updated values of the forward start gear, the forward maximum speed of the vehicle, the sensitivity percent (e.g., load sensitivity), the aggressiveness of gear shifting, the PTO target speed (and/or installation type), the engine speed minimum, the engine speed maximum, and the autoshift A/B presets (e.g., shifting profiles)). In some embodiments, step 608 is performed by the operator interface 40 (e.g., responsive to a user input or operation of the operator interface 40), the neural network 414, and/or the cloud computing system 404.

Process 600 includes generating an updated profile including one or more updated attributes of the profile based on the machine learning data, the sensor data, or the user input (step 610), according to some embodiments. In some embodiments, step 610 is performed by the profile updater 412. In some embodiments, step 610 includes adjusting or updating one or more of the parameters or attributes of the profile according to step 608.

Process 600 includes displaying the profile or the updated profile and one or more attributes of the profile or updated profile to the user via a display screen (step 612), according to some embodiments. In some embodiments, step 612 is performed by the GUI manager 518 and the operator interface 40. In some embodiments, step 612 includes displaying editable fields that the user or operator can provide inputs to in order to adjust or update the one or more attributes or parameters of the profile. In some embodiments, step 612 includes displaying the values of the attributes or parameters of the profile or the updated profile on the operator interface 40 so that the user or operator can view the profile.

Referring to FIGS. 7-14, various GUIs that can be displayed to the operator or user of the vehicle 10 are shown, according to some embodiments. The GUIs may be displayed on a touch screen so that the operator or user can navigate through the different GUIs, make selections for which profile should be active, adjust or update parameters or attributes of the profiles, etc.

Figure 7:
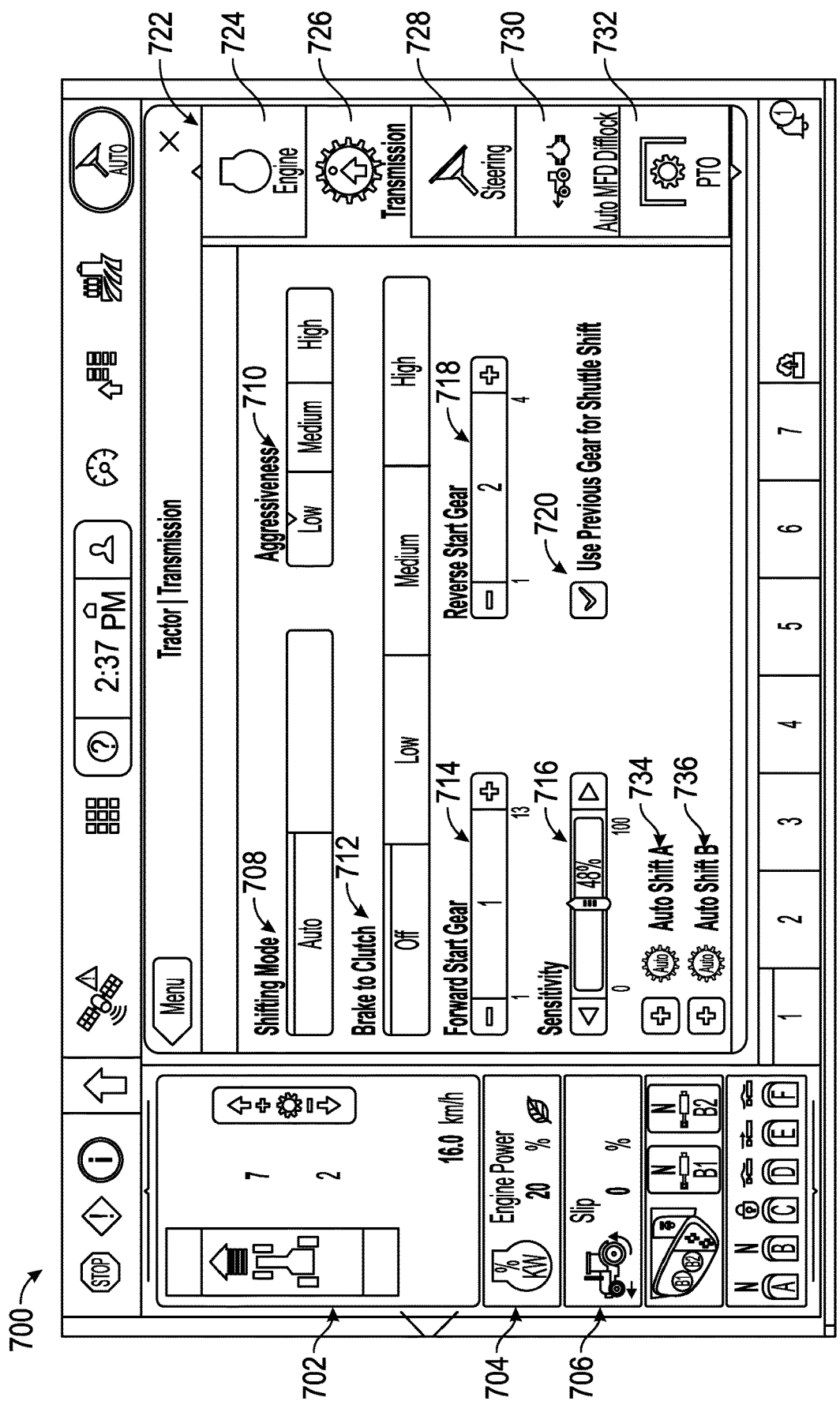
FIG. 7 is a graphical user interface (GUI) for a display screen of the vehicle of FIG. 1, according to an exemplary embodiment.

Referring particularly to FIG. 7, a transmission GUI 700 includes icons 702 that illustrate a direction of travel and a current gear of the vehicle 10, a current speed of the vehicle, and a gear selector. The transmission GUI 700 also includes an engine power icon 704 that illustrates power output or remaining power level. The transmission GUI 700 may also include a slip icon 706 that illustrates an amount of slip on wheels or tractive elements of the vehicle 10. In some embodiments, the transmission GUI 700 includes multiple buttons 722 that navigate to different screens. The buttons 722 include an engine button 724 that can be pressed to navigate to an engine screen, a transmission button 726 that can be pressed to navigate to a transmission screen, a steering button 728 that can be pressed to navigate to a steering screen, a differential button 730 that can be pressed to navigate to a differential screen, and a PTO button 732 that can be pressed to navigate to a PTO screen.

The transmission GUI 700 includes a shifting mode selector 708 that can be pressed to toggle between automatic shifting and manual shifting of the transmission 56. In some embodiments, the transmission 56 can only be switched between automatic shifting and manual shifting when the transmission 56 is in park. In some embodiments, the automatic shifting is configured to remain active through a key-cycle of the vehicle 10. In some embodiments, when the automatic shifting is selected by the selector 708, the controller 202 is configured to use either the autoshift profile A or the autoshift profile B to determine when to shift between gears (e.g., what engine speed and vehicle speed to upshift or downshift the transmission 56 between gears). In some embodiments, the controller 202 automatically selects which of the autoshift profile A or the autoshift profile B to use based on an environment or application of the vehicle 10 (e.g., use the autoshift profile A when driving down a road, and use the autoshift profile B when in a field, or vice versa). In some embodiments, the transmission GUI 700 also includes an aggressiveness selector 710 that can be used to select which of a low, medium, or high aggressiveness for the transmission 56 to use when shifting between gears. In some embodiments, the aggressiveness selector 710 is automatically set to the value as indicated by the profile until the operator or user changes the aggressiveness by adjusting the aggressiveness selector 710. The transmission GUI 700 also includes a brake to clutch selector 712 that includes an off button, a low button, a medium button, and a high button. In some embodiments, the aggressiveness and sensitivity of the transmission 56 are not separate for each of multiple APM modes or presets.

The transmission GUI 700 also includes a forward start gear indicator/selector 714, according to some embodiments. In some embodiments, the forward start gear indicator/selector 714 displays a current attribute or parameter of the profile (e.g., the gear that the transmission 56 starts at when the vehicle 10 starts from a stop or sufficiently low speed state), and includes an up and down button which can be pressed in order to increase or decrease the attribute or parameter of the profile (e.g., to increase or decrease the start gear that the transmission 56 initially starts in when the vehicle 10 is accelerated from stop or from the sufficiently low speed state). In some embodiments, the transmission GUI 700 also includes a reverse start gear indicator/selector 718 which can be used to increment (e.g., increase or decrease) a reverse start gear. In some embodiments, the reverse start gear is another parameter or attribute of the profile that the controller 202 uses to operate the transmission 56 of the vehicle. The reverse start gear specifically indicates a starting reverse gear that the transmission 56 is shifted into when operating to accelerate the vehicle 10 in the reverse direction from a stop or from a sufficiently low speed state.

The transmission GUI 700 also includes a sensitivity indicator/selector 716 that displays current sensitivity of the transmission 56 to load inputs, and an increase and decrease button. The value displayed on the sensitivity indicator/selector 716 before adjustment by the operator or user corresponds to the value of the sensitivity attribute or parameter of the profile. In some embodiments, the sensitivity can be increased or decreased by pressing the up button or the down button, or by pressing and holding a slider (e.g., between 0% and 100%).

The transmission GUI 700 also includes a selection button 720 to use a previous gear for a shuttle shift. When the selection button 720 is selected, the transmission 56 uses the previous gear for shuttle shifting. When the selection button 720 is not selected, the transmission 56 does not use the previous gear for shuttle shifting.

The transmission GUI 700 also includes an autoshift profile A selector 734, and an autoshift profile B selector 736 which can be pressed to expand and display the autoshift profile A or the autoshift profile B. When the autoshift profile A selector 734 is expanded, the operator or user may view and adjust parameters of the autoshift profile A. Similarly, when the autoshift profile B selector 736 is expanded, the operator or user may view and adjust parameters of the autoshift profile B.

Figure 8:
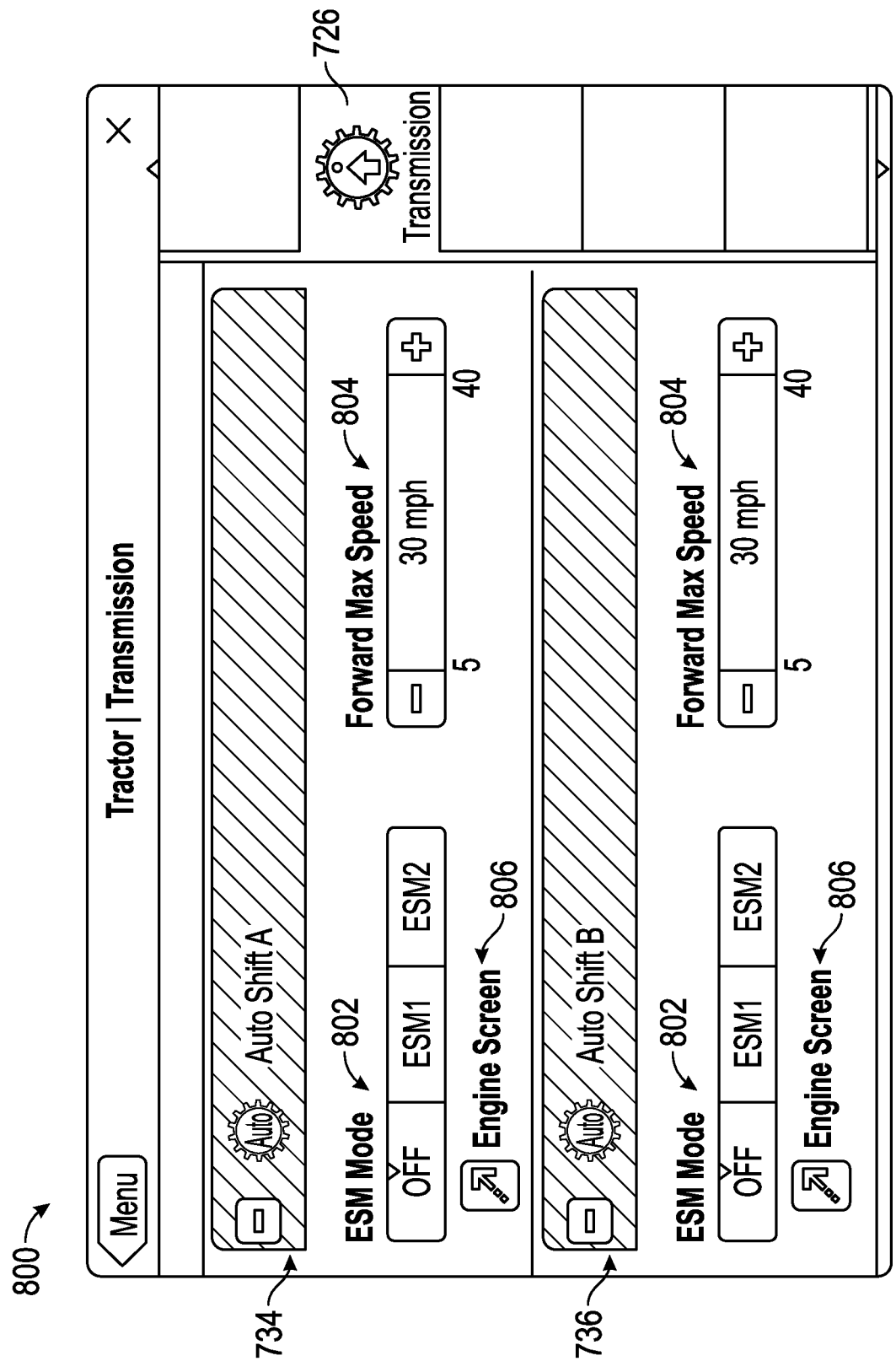
FIG. 8 is another GUI for the display screen of the vehicle of FIG. 1, according to an exemplary embodiment.

Referring to FIG. 8, an autoshift GUI 800 is shown with the autoshift profile A selector 734 expanded and the autoshift profile B selector 736 expanded, according to some embodiments. The autoshift GUI 800 includes multiple engine speed management (ESM) selectors 802 for both the autoshift profile A and the autoshift profile B, which includes an off selector, a first mode, ESM1 selector, and a second mode ESM2 selector. The operator or user may select which of the autoshift profiles use which of the ESM modes to use when active by pressing the ESM1 or the ESM2 selectors for the autoshift profiles. In some embodiments, the ESM modes are linked to which of multiple APM presets are selected. In some embodiments, the autoshift GUI 800 also includes a forward max speed indicator/selector 804 for the autoshift profile A and the autoshift profile B that displays a maximum allowable forward speed of the vehicle 10 that can be adjusted (e.g., increased or decreased). In some embodiments, the maximum allowable forward speed for the autoshift profile A and the autoshift profile B are preset as the values of the attributes or parameters of the profile until adjusted by the operator or user. The autoshift GUI 800 also include engine screen callout icons 806 for both the autoshift profile A and the autoshift profile B which can be selected by the operator or user to pop out or redirect to an engine screen. In some embodiments, the ESM mode can be selected for the autoshift profile A and the autoshift profile B so that when the autoshift profile A or B is selected, the correspondingly set ESM mode is automatically activated. In some embodiments, the forward max speed is a function of a forward start gear that is chosen as the vehicle 10 is started (e.g., at a key-on event). In some embodiments, the forward max speed of the vehicle 10 correlates with what a high idle in the corresponding gear would achieve. In some embodiments, operating a throttle of the vehicle 10 results in from 40% to 100% of a current setting for the maximum forward speed in order to simulate a range of effectiveness of the throttle in a given gear (e.g., 900 RPM to 2240 RPM of the prime mover 52).

Figure 9:
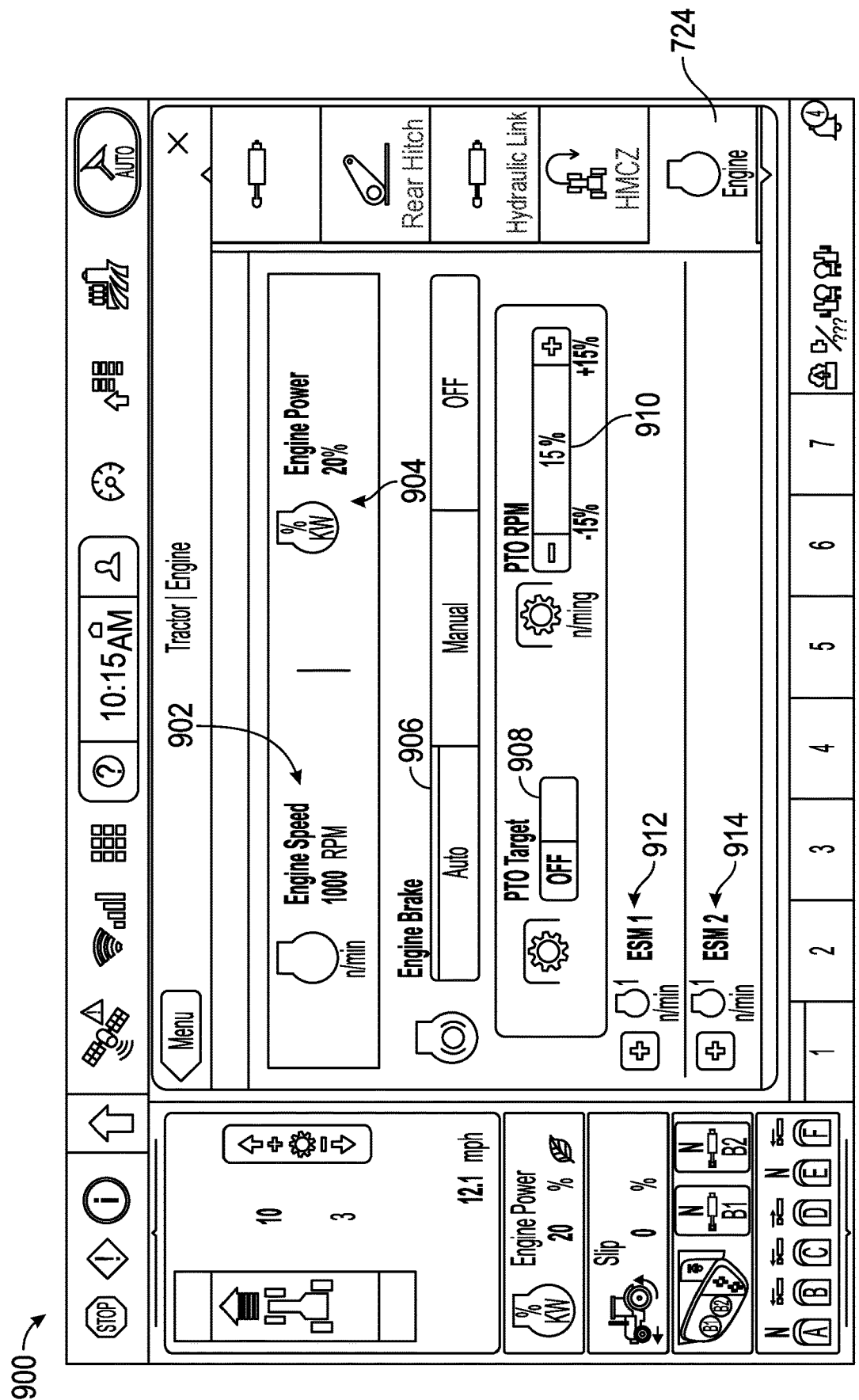
FIG. 9 is another GUI for the display screen of the vehicle of FIG. 1, according to an exemplary embodiment.

Referring to FIG. 9, an engine GUI 900 that is presented when the engine button 724 is selected is shown, according to some embodiments. The engine GUI 900 includes an engine speed icon 902 that illustrates current engine speed, an engine power icon 904 that illustrates current engine power, and an engine braking selector 906. The engine speed icon 902 may illustrate current revolutions per minute (rpm) of the prime mover 52. In some embodiments, the engine braking selector 906 can be transitioned between an automatic mode, a manual mode, and an off mode. Updating the engine braking selector 906 between the automatic mode, the manual mode, and the off mode transitions operation of the prime mover 52 between different engine braking modes.

Referring still to FIG. 9, the engine GUI 900 also includes a PTO target selector 908, and a PTO RPM selector 910. When the PTO target selector 908 is toggled to "on" the user or operator can adjust the PTO RPM selector 910 to set a target speed of the PTO 90. In some embodiments, the operator may control the PTO RPM selector 910 to increase or decrease by 15% from nominal. In some embodiments, the 15% increment amount corresponds to a change resulting from performing a shifting of the transmission 56 between subsequent gears. In some embodiments, a thumbwheel of a joystick or input device can be operated to make minor or incremental adjustments (e.g., smaller than 15%, or by 0.1 of units used for the PTO rpm). The engine GUI 900 also includes an ESM1 selector 912 and an ESM2 selector 914 that the operator can expand to view and adjust engine speed management settings for a first and second mode. The engine GUI 900 can also include an economy (ECO) mode to operate the prime mover 52 to conserve fuel consumption and allow the operator to set a maximum engine speed for the ECO mode.

Figure 10:
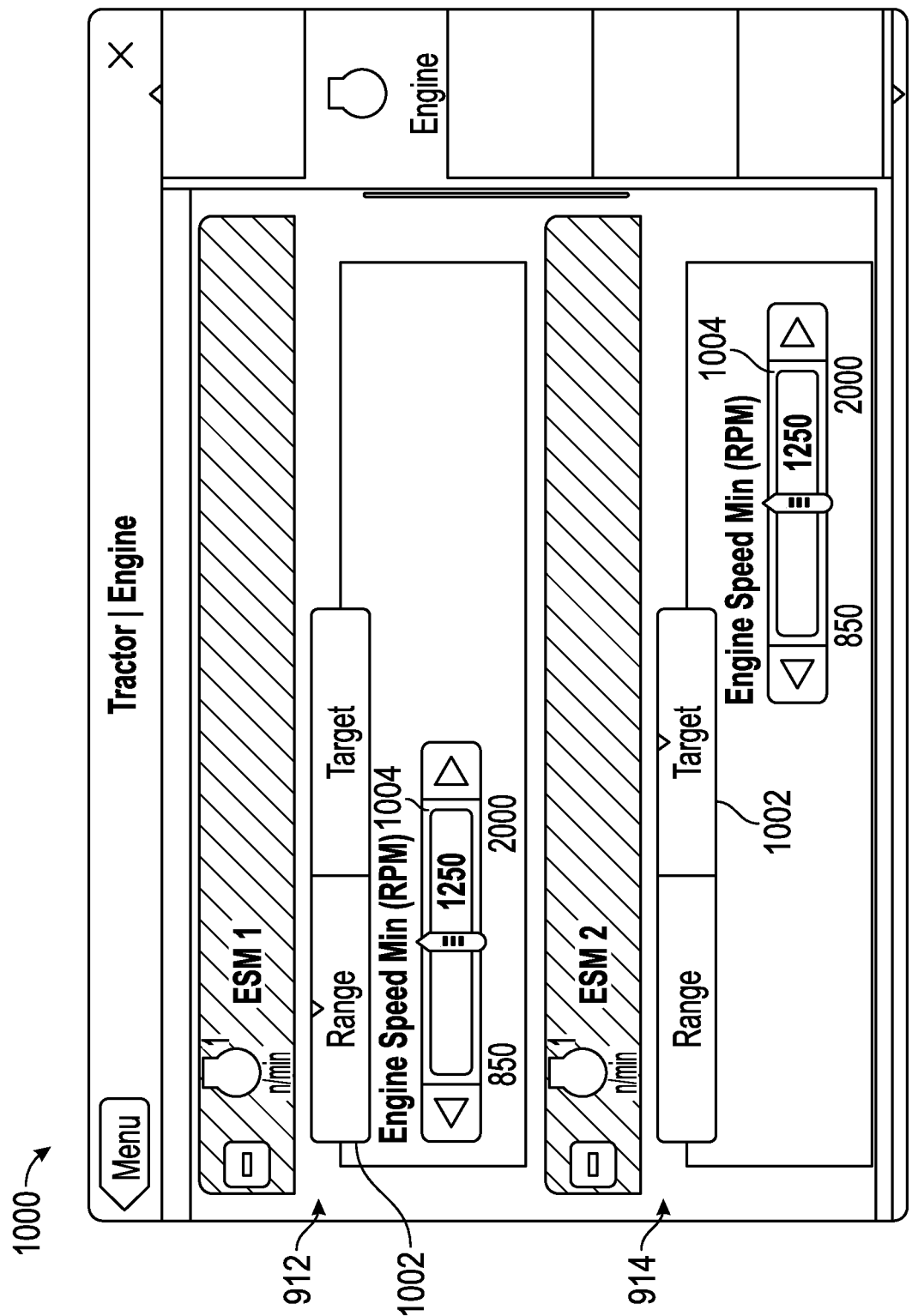
FIG. 10 is another GUI for the display screen of the vehicle of FIG. 1, according to an exemplary embodiment.

Referring to FIG. 10, an ESM GUI 1000 illustrates the ESM1 selector 912 and the ESM2 selector 914 expanded, according to some embodiments. The ESM GUI 1000 includes a range/target selector 1002 for both the ESM1 and the ESM2. The range/target selectors 1002 can be toggled between a range setting (e.g., a minimum range) or a target setting to either set a range of acceptable engine speed values, or to set a target engine speed value. In FIG. 10, the ESM1 is shown with the corresponding range/target selector 1002 toggled to "range" while the ESM2 is shown with the corresponding range/target selector 1002 toggled to "target." The ESM GUI 1000 includes an engine speed minimum selector 1004 that the operator can adjust to set a minimum speed of the prime mover 52. If manual shift mode is activated, adjusting the engine speed minimum selector 1004 may result in scaling a throttle input such that full throttle achieves maximum engine speed, and zero throttle results in the engine speed illustrated by the engine speed minimum selector 1004 (which can be adjusted by operating the engine speed minimum selector 1004). If autoshift mode is selected, adjusting the engine speed minimum selector 1004 sets a range of allowable engine speed such that a higher value of the minimum engine speed can be used for situations where large load changes occur, to thereby limit how far the transmission 56 will upshift during times of light load. In some embodiments, the ESM GUI 1000 also includes an engine speed maximum selector that is similar to the engine speed minimum selector 1004 so that the operator can adjust the engine speed maximum selector to set a maximum speed for the prime mover 52.

Referring still to FIG. 10, the ESM GUI 1000 also includes an engine speed target selector 1004 that the operator can adjust to set a target speed for the prime mover 52. If manual shift mode is active, then adjusting the engine speed target selector 1004 may result in limiting the prime mover 52 to the engine speed target as illustrated. If autoshift mode is active, then the target speed for the prime mover 52 as set by the engine speed target selector 1004 is used as target engine speed, and this engine speed is prioritized for control purposes over a ground speed so that ground speed of the vehicle 10 is as close as possible to a target ground speed, while achieving the target engine speed as set at the engine speed target selector 1004. In some embodiments, the operator can adjust the engine speed target selector 1004 once the corresponding range/target selector 1002 for the ESM2 is set to "target."

Figure 11:
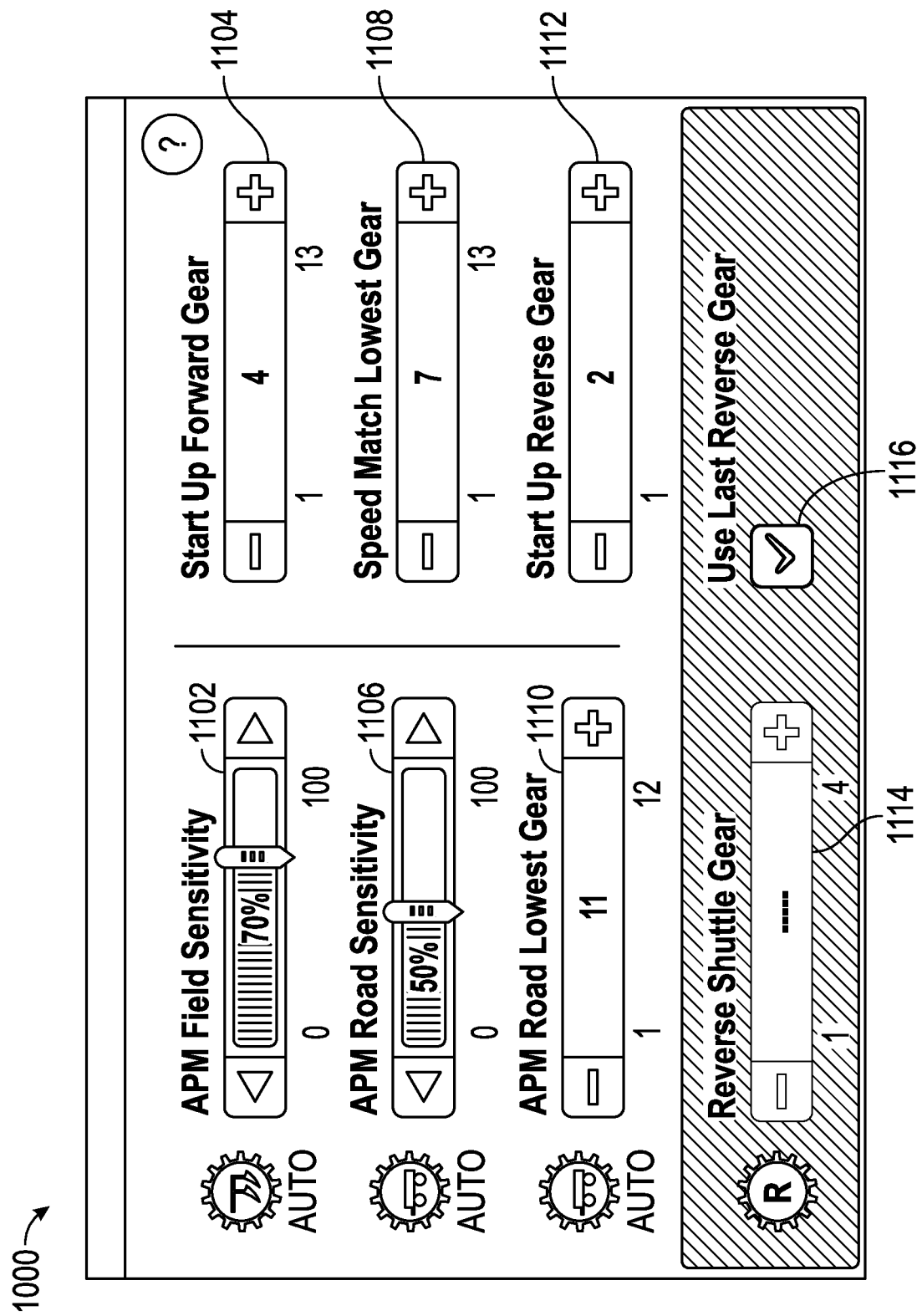
FIG. 11 is another GUI for the display screen of the vehicle of FIG. 1, according to an exemplary embodiment.
Figure 12:
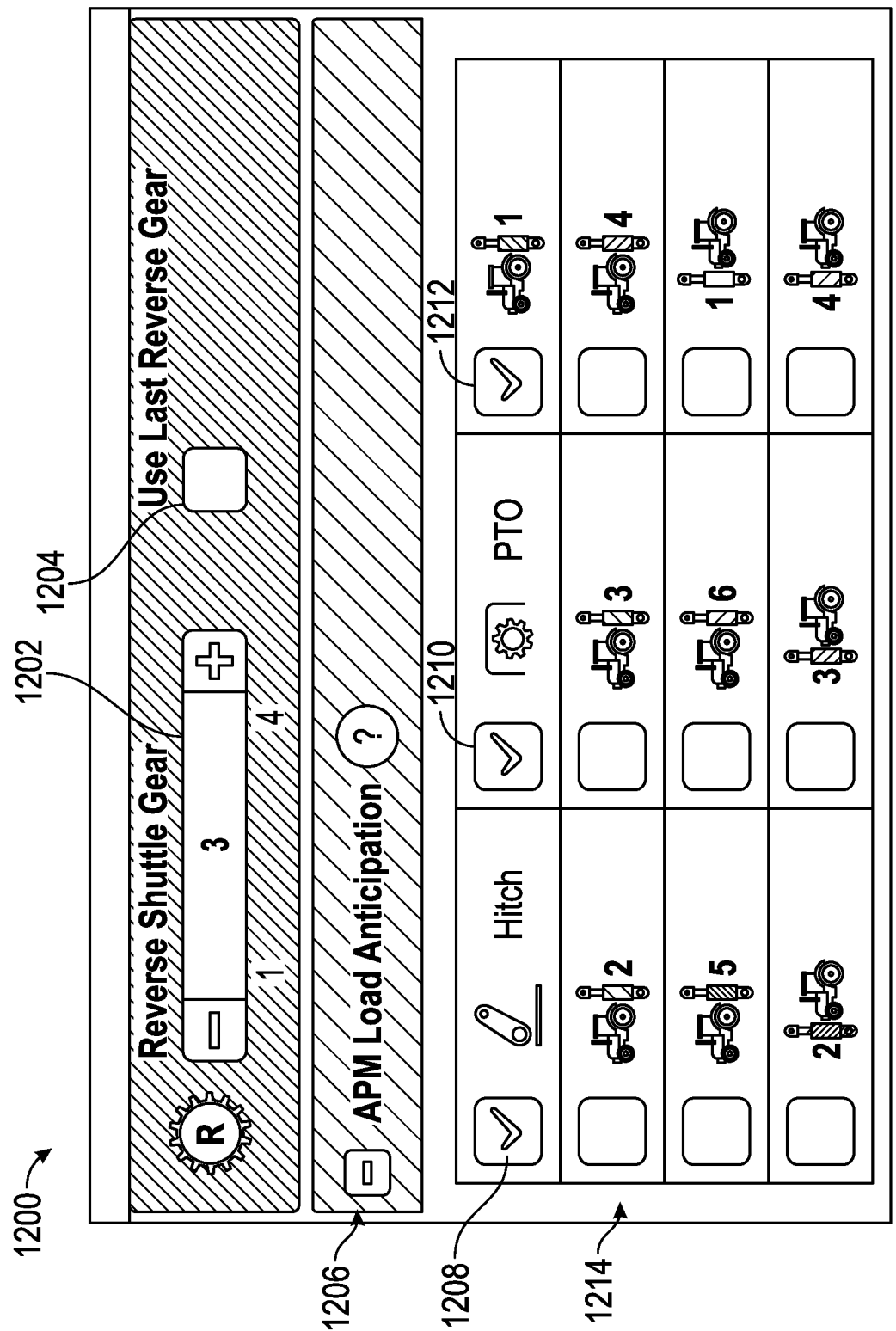
FIG. 12 is another GUI for the display screen of the vehicle of FIG. 1, according to an exemplary embodiment.

Referring to FIGS. 11-13, a profile GUI 1100 illustrates various parameters or attributes of the profile for the vehicle 10. The profile GUI 1100 may function to display current values of the parameters or attributes of the profile, and also enable the operator to adjust or the values of the parameters or attributes of the profile. In some embodiments, the values of the attributes or parameters shown in FIGS. 11-13 are set to the values determined by the profile by default (e.g., the) and may be subsequently updated by the operator by providing inputs or adjustments to the profile GUI 1100.

Referring particularly to FIG. 11, the profile GUI 1100 includes an APM field sensitivity indicator/selector 1102, a start up forward gear indicator/selector 1104, an APM road sensitivity indicator/selector 1106, a speed match lowest gear indicator/selector 1108, an APM road lowest gear indicator/selector 1110, a start up reverse gear indicator/selector 1112, a reverse shuttle gear indicator/selector 1114, and a use last gear selector 1116, according to some embodiments. In some embodiments, the APM field sensitivity is a percentage value that can be adjusted. The APM field sensitivity may be a value that determines how frequently the transmission 56 responds to load changes during field work or operation of the vehicle 10. In some embodiments, a higher setting or value of the APM field sensitivity results in increased shift frequency of the transmission 56 between gears, while a lower setting or value of the APM field sensitivity results in decreased shift frequency of the transmission 56 between gears. If the transmission 56 is shifting too frequently, or more frequently than the operator desires, the operator can adjust the APM field sensitivity to a decreased value or vice versa by adjusting a slider of the APM field sensitivity indicator/selector 1102.

Referring still to FIG. 11, the operator may adjust the start up forward gear by adjusting the start up forward gear indicator/selector 1104. The start up forward gear defines the gear that the transmission 56 uses at start up of the vehicle 10 if the operator does not select any other gear. In some embodiments, the start up forward gear has a default value of 7 (e.g., the seventh gear). In some embodiments, the start up forward gear can be adjusted by pressing the plus or minus buttons of the start up forward gear indicator/selector 1104. The start up forward gear may have any value between 1 and 13, according to some embodiments.

Referring still to FIG. 11, the operator may adjust the APM road sensitivity by adjusting the APM road sensitivity indicator/selector 1106. In some embodiments, the APM road sensitivity is a percentage value that can be adjusted. The APM road sensitivity may be a value that determines how frequently the transmission 56 responds to load changes during road operation of the vehicle 10. In some embodiments, a higher setting or value of the APM road sensitivity results in increased shift frequency of the transmission 56 between gears, while a lower setting or value of the APM road sensitivity results in decreased shift frequency of the transmission 56 between gears. If the transmission 56 is shifting too frequently, or more frequently than the operator desires, the operator can adjust the APM road sensitivity to a decreased value or vice versa by adjusting a slider of the APM road sensitivity indicator/selector 1102.

Referring still to FIG. 11, the operator may adjust the speed match lowest gear by adjusting the speed match lowest gear indicator/selector 1108. In some embodiments, the speed match lowest gear defines a lowest gear that the transmission 56 may use to match current speed of the vehicle 10 such that the transmission 56 re-engages smoothly when a pedal is released or when the transmission 56 is re-shifted into a forwards gear. In some embodiments, the speed match lowest gear has a default value of 7, but may have a value of 1 through 13 (e.g., the seventh gear, and the first through thirteenth gear, respectively). In some embodiments, the operator may press the plus or minus buttons of the speed match lowest gear indicator/selector 1108 to increase or decrease the value of the speed match lowest gear.

Referring still to FIG. 11, the operator may adjust the APM road lowest gear by adjusting the APM road lowest gear indicator/selector 1110. In some embodiments, the APM road lowest gear defines or is a lowest gear that the transmission 56 can use when transporting on a road with throttle fully open. In some embodiments, a default value of the APM road lowest gear is 11 (e.g., the eleventh gear), but may have a value of 1-12 (e.g., adjustable via pressing the plus or minus buttons of the APM road lowest gear indicator/selector 1110.

Referring still to FIG. 11, the operator may adjust the start up reverse gear by adjusting the start up reverse gear 1112. In some embodiments, the start up reverse gear is or defines a reverse gear that is used at start up of the vehicle 10 if the operator does not select a different gear. The start up reverse gear may have a default value of 2 (e.g., the second gear), but may have any value or may be adjusted by the operator to any value of 1-4 (e.g., the first gear, the second gear, the third gear, or the fourth gear in reverse).

Referring still to FIG. 11, the operator may adjust the reverse shuttle gear (if the use last reverse gear selector 1116 is not selected) by adjusting the reverse shuttle gear indicator/selector 1114. In some embodiments, the reverse shuttle gear is or defines the reverse gear that is used whenever the transmission 56 performs shuttle-shifting from a forwards gear to a reverse gear. In some embodiments, the reverse shuttle gear has a default value of 2 (e.g., the second reverse gear). In some embodiments, the reverse shuttle gear can have any value of 1-6, which may be adjusted by the operator pressing the plus or minus buttons of the reverse shuttle gear indicator/selector 1114.

Referring still to FIG. 11, the use last reverse gear selector 1116 may be toggled between a selected state or a deselected state. If the use last reverse gear selector 1116 is in the selected state (e.g., as shown in FIG. 11), the transmission 56 may select a previously used reverse gear to begin reverse travel of the vehicle 10 during shuttle shifting from a forwards gear to a reverse gear. If the use last reverse gear selector 1116 is in the deselected state, the transmission 56 may select the reverse gear as indicated in the reverse shuttle gear indicator/selector 1114 when shuttle-shifting from a forwards gear to a reverse gear.

Referring to FIG. 12, a load anticipation GUI 1200 includes an APM load anticipation pane 1206 that may be selectably expanded to view and select one or more anticipated loads. FIG. 12 illustrates a hitch load 1208 that is selected, a PTO load 1210 that is selected, and a first rear remote valve 1212 that are selected. In APM field operations, the loads, when active, may trigger a downshift of the transmission 56 in anticipation of a load increase to thereby maintain speed of the vehicle 10 and mitigate or reduce a likelihood of engine stall. In some embodiments, the various selectable loads of FIG. 12 may depend on a type of the vehicle 10 and one or more available loads. In some embodiments, the loads 1208-1214 may be selected by checking or unchecking boxes for the implement 92. In some embodiments, the loads 1208-1214 are automatically selected by the controller 202 responsive to identifying the type of the implement 92. In some embodiments, the selected loads may remain active through various cycles and can be checked or updated when the implement 92 is changed.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

What is claimed is:

1. An agricultural vehicle comprising:
   a driveline comprising an engine, a transmission, and a power take off (PTO);
   an interface configured to removably couple an implement with the agricultural vehicle, the implement configured to perform an agricultural function; and
   a control system comprising processing circuitry configured to:
     obtain an indication of a type of the implement that is removably coupled with the agricultural vehicle;
     determine a profile for at least the transmission based on the type of the implement that is removably coupled with the agricultural vehicle, the profile comprising one or more operating parameters for at least the transmission such that the transmission operates in a specific manner for the type of the implement, the one or more operating parameters including a forward start gear for the transmission; and
     operate at least the transmission according to the one or more operating parameters of the profile.

2. The agricultural vehicle of claim 1, wherein the control system comprises an imaging device configured to obtain an image of the implement, wherein obtaining the indication of the type of the implement and determining the profile comprise:
   performing an image recognition or analysis technique using the image of the implement to determine the type of the implement; and
   determining the profile by retrieving a predetermined profile comprising a plurality of the one or more operating parameters that are specific to the type of the implement, the plurality of the one or more operating parameters configured to be used to operate at least the transmission of the agricultural vehicle in the specific manner for the type of the implement.

3. The agricultural vehicle of claim 1, wherein obtaining the indication of the type of the implement comprises:
   receiving a user input from a display screen of the control system, the user input comprising the type of the implement.

4. The agricultural vehicle of claim 1, wherein obtaining the indication of the type of the implement comprises:
   establishing communications between a controller of the implement and the processing circuitry through a communications interface; and
   reading the type of the implement from the controller.

5. The agricultural vehicle of claim 1, wherein the one or more operating parameters comprise a plurality of operating parameters including the forward start gear for transition, a maximum forwards speed of the agricultural vehicle, a load sensitivity for the transmission, a shifting aggressiveness for the transmission, a target speed for the PTO, a minimum speed of the engine, a maximum speed of the engine, and a shifting profile for the transmission.

6. The agricultural vehicle of claim 1, wherein the one or more operating parameters are automatically determined and set by the processing circuitry without requiring an operator of the agricultural vehicle to set values for any of the one or more operating parameters.

7. The agricultural vehicle of claim 1, wherein the processing circuitry is configured to determine or adjust the profile and the one or more operating parameters of the profile based on an indication of whether the agricultural vehicle is currently in field use or being transported on a road.

8. A control system for an agricultural vehicle, the control system comprising processing circuitry configured to:
   obtain an indication of a type of an implement that is removably coupled with the agricultural vehicle;
   determine a profile for at least a transmission of the agricultural vehicle based on the type of the implement that is removably coupled with the agricultural vehicle, the profile defining one or more operating parameters for at least the transmission such that the transmission operates in a specific manner for the type of the implement, the one or more operating parameters including a forward start gear for the transmission; and
   operate at least the transmission according to the one or more operating parameters of the profile.

9. The control system of claim 8, wherein the control system comprises an imaging device configured to obtain an image of the implement, wherein obtaining the indication of the type of the implement and determining the profile comprise:
   performing an image recognition or analysis technique using the image of the implement to determine the type of the implement; and
   determining the profile by retrieving a predetermined profile comprising the one or more operating parameters that are specific to the type of the implement, the one or more operating parameters configured to be used to operate at least the transmission of the agricultural vehicle in the specific manner for the type of the implement.

10. The control system of claim 8, wherein obtaining the indication of the type of the implement comprises:
    receiving a user input from a display screen of the control system, the user input comprising the type of the implement.

11. The control system of claim 8, wherein obtaining the indication of the type of the implement comprises:
    establishing communications between a controller of the implement and the processing circuitry through a communications interface; and
    reading the type of the implement from the controller.

12. The control system of claim 8, the one or more operating parameters further including:
    a load sensitivity for the transmission;
    a target speed for the PTO;
    a maximum forwards speed of the agricultural vehicle;
    a shifting aggressiveness for the transmission;
    a minimum speed of an engine;
    a maximum speed of the engine; and
    a shifting profile for the transmission.

13. The control system of claim 12, wherein the one or more operating parameters are automatically determined and set by the processing circuitry without requiring an operator of the agricultural vehicle to set values for any of the one or more operating parameters.

14. The control system of claim 8, wherein the processing circuitry is configured to determine or adjust the profile and the one or more operating parameters of the profile based on an indication of whether the agricultural vehicle is currently in field use or being transported on a road.

15. The control system of claim 8, wherein the profile and the one or more operating parameters of the profile are determined by the processing circuitry by performing a machine learning technique that uses performance metrics and corresponding values of the one or more operating parameters obtained from a population of agricultural vehicles that are removably coupled with implements that are a same type of the implement, the machine learning technique using the performance metrics and the corresponding values of the one or more operating parameters as training data to predict a value of the one or more operating parameters that achieves a desired value of the performance metrics.

16. A method for automatically configuring an agricultural vehicle for a specific type of implement, the method comprising:
    obtaining an indication of a type of an implement that is removably coupled with the agricultural vehicle;
    determining a profile for at least a transmission based on the type of the implement that is removably coupled with the agricultural vehicle, the profile comprising one or more operating parameters for at least the transmission such that the transmission operates in a specific manner for the type of the implement, the one or more operating parameters comprising a forward start gear for the transmission; and
    operating at least the transmission according to the one or more operating parameters of the profile.

17. The method of claim 16, wherein obtaining the indication of the type of the implement and determining the profile comprise:
    performing an image recognition or analysis technique using an image of the implement to determine the type of the implement; and
    determining the profile by retrieving a predetermined profile comprising the one or more operating parameters that are specific to the type of the implement, the one or more operating parameters configured to be used to operate at least the transmission of the agricultural vehicle in the specific manner for the type of the implement.

18. The method of claim 16, wherein obtaining the indication of the type of the implement comprises:
    receiving a user input from a display screen of a control system, the user input comprising the type of the implement.

19. The method of claim 16, wherein the one or more operating parameters are a plurality of operating parameters that further include:
    a maximum forwards speed of the agricultural vehicle;
    a load sensitivity for the transmission;
    a shifting aggressiveness for the transmission;
    a target speed for a power take off (PTO);
    a shifting profile for the transmission;
    a minimum speed of an engine; and
    a maximum speed of the engine.

20. The method of claim 19, wherein the plurality of operating parameters are automatically determined and set without requiring an operator of the agricultural vehicle to set values for any of the plurality of operating parameters.

* * * * *